US 6,662,091 B2

(12) United States Patent
Wilson et al.

(10) Patent No.: US 6,662,091 B2
(45) Date of Patent: Dec. 9, 2003

(54) DIAGNOSTICS/PROGNOSTICS USING WIRELESS LINKS

(75) Inventors: Bary W. Wilson, Richland, WA (US); Earl Heister, West Richland, WA (US); Frank L. Greitzer, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/029,048

(22) Filed: Dec. 20, 2001

(65) Prior Publication Data

US 2003/0004624 A1 Jan. 2, 2003

Related U.S. Application Data

(60) Provisional application No. 60/302,244, filed on Jun. 29, 2001.

(51) Int. Cl.$^7$ ............................................. G01M 17/00
(52) U.S. Cl. ........................... 701/33; 701/29; 340/438; 340/439
(58) Field of Search ............................. 701/24, 29, 30, 701/33, 34; 340/438, 439, 500, 525

(56) References Cited

U.S. PATENT DOCUMENTS

| | | | |
|---|---|---|---|
| 3,748,894 A | 7/1973 | White et al. | 73/36 |
| 4,118,973 A | 10/1978 | Tucker et al. | 73/55 |
| 4,750,351 A | 6/1988 | Ball | 73/55 |
| 4,959,995 A | 10/1990 | Deysarkar et al. | 73/54 |
| 5,262,732 A | 11/1993 | Dickert et al. | 324/672 |
| 5,377,531 A | 1/1995 | Gomm | 73/53.05 |
| 5,521,698 A | 5/1996 | Carroll et al. | 356/70 |
| 5,537,336 A | 7/1996 | Joyce | 364/510 |
| 5,569,842 A | 10/1996 | Silvestri | 73/53.05 |
| 5,721,759 A | 2/1998 | Raatikainen | 378/47 |
| 5,739,916 A | 4/1998 | Englehaupt | 356/414 |
| 5,789,665 A | 8/1998 | Voelker et al. | 73/53.05 |
| 5,817,928 A | 10/1998 | Garvey, III et al. | 73/53.05 |
| 5,942,979 A * | 8/1999 | Luppino | 340/576 |
| 5,982,847 A | 11/1999 | Nelson | 378/47 |
| 6,006,154 A | 12/1999 | Wang | 701/110 |
| 6,037,592 A | 3/2000 | Sunshine et al. | 250/343 |
| 6,043,505 A | 3/2000 | Ames et al. | 250/577 |
| 6,246,320 B1 * | 6/2001 | Monroe | 340/506 |
| 6,253,064 B1 * | 6/2001 | Monroe | 455/66 |
| 6,304,176 B1 * | 10/2001 | Discenzo | 340/539 |
| 6,356,205 B1 * | 3/2002 | Salvo et al. | 340/853.3 |
| 2001/0013247 A1 | 8/2001 | Wilson et al. | 73/54.01 |

OTHER PUBLICATIONS

Goodyear; MEMS Based Smart Tires; 1999.
Bary W. Wilson et al., *Modular System for Multi–Parameter In–Line Machine Fluid Analysis*; Technology Showcase 2000; Apr. 3–6, 2000.

\* cited by examiner

*Primary Examiner*—William A. Cuchlinski, Jr.
*Assistant Examiner*—Marthe Y. Marc-Coleman
(74) *Attorney, Agent, or Firm*—Woodard, Emhardt, Moriarty, McNett & Henry LLP

(57) ABSTRACT

A system and method for monitoring operating parameters of a machine (such as a vehicle) and producing diagnostic and/or prognostic results are disclosed. Active, semi-active, or semi-passive sensors are wirelessly linked with an interrogator that selectively interrogates the sensors, such as through transponders in wired communication with the sensors. A data concentrator or processor analyzes data from certain sensors and generates diagnostic/prognostic conclusions, in some cases using additional data selectively requested from and acquired by the sensors. In some embodiments, raw or abstracted data is communicated with a management center that provides troubleshooting information (again, possibly using additional, selectively acquired data), makes resource management decisions (such as preparing parts or labor resources to make a repair), and tracks problems in all or a subset of the machines being managed.

30 Claims, 7 Drawing Sheets

DIAGNOSTICS/PROGNOSTICS USING WIRELESS LINKS

REFERENCE TO RELATED APPLICATION

Priority is claimed to co-pending U.S. Provisional Patent Application No. 60/302,244, filed Jun. 29, 2001.

BACKGROUND

The present invention relates to diagnostic/prognostic techniques, and more particularly, but not exclusively, relates to diagnostic and/or prognostic systems for machines, where the systems include sensors that communicate information through wireless transponders.

As machines become more sophisticated, the desire has grown for techniques to determine and/or predict machine failures in a more cost-effective manner. The condition-based maintenance approach of on-board diagnostics and prognostics can substantially reduce the life-cycle costs of owning and operating machines. However, retrofitting existing machines with sensors required for on-board diagnostics and prognostics is often impractical due in large measure to the cost and complexity of installing the necessary wiring and wiring harnesses. Thus, there is an ongoing need for further contributions in this area of technology.

Present diagnostic and prognostic systems and methods suffer from limitations in ease, cost, and flexibility of installation. There is thus a need for further contributions and improvements to sensor system technology.

SUMMARY

It is an object of the present invention to provide an improved system and method for retrieving and processing sensor data regarding the operation of the machine. This object and others are achieved by various forms of the present invention.

One embodiment of the present invention is a unique technique for providing diagnostics and/or prognostics for a machine. Other embodiments include unique diagnostic/prognostic systems, apparatus, and methods for machinery.

A further embodiment includes a system for performing diagnostics and prognostics on a machine, especially a mobile or remotely located machine. The system comprises one or more wireless sensors forming a network with one or more sensor interrogators, data concentrators, and/or processing nodes, and a way to communicate the resulting data from the machine to an operator or an automated monitor. This system is arranged to measure operational parameters of the machine with the sensors, where such parameters might include temperature, pressure, vibration, and/or fluid quality, to name just a few. This information stream is relayed to the data concentrator, and analyzed by a processing node to trend certain parameters or sets of parameters. The information stream and resulting trends are used to make predictions as to remaining useful life of machine components, fluids, etc. In one form of this embodiment, the machine is a vehicle.

A still further embodiment includes a diagnostic/prognostic system with one or more sensors, a number of wireless transponders (semi-passive, semi-active, and/or active radio frequency (RF) tags) coupled to the sensors, and one or more data collection devices. The one or more data collection devices interrogate the transponders to obtain information about the operation of the vehicle or other machine instrumented with the sensors. By virtue of this wireless technology, sensor networks can be installed on the machine after-market without the need for installation of complex and expensive wiring harnesses. As an alternative or in addition to such retrofits, the system can be configured for new or different applications and upgraded as necessary by installing the required sensors and their associated transponders.

In another aspect of the invention, an interrogator wirelessly sends an interrogation signal to a sensor tag. The sensor tag reflects the interrogation signal using backscatter techniques so that the reflected signal indicates a value of an vehicle operating parameter. The interrogator communicates the parameter(s) to a processor, which analyzes the information to make diagnostic and/or prognostic determinations related to the vehicle.

DESCRIPTION OF THE ILLUSTRATED EMBODIMENTS

Figure 1:
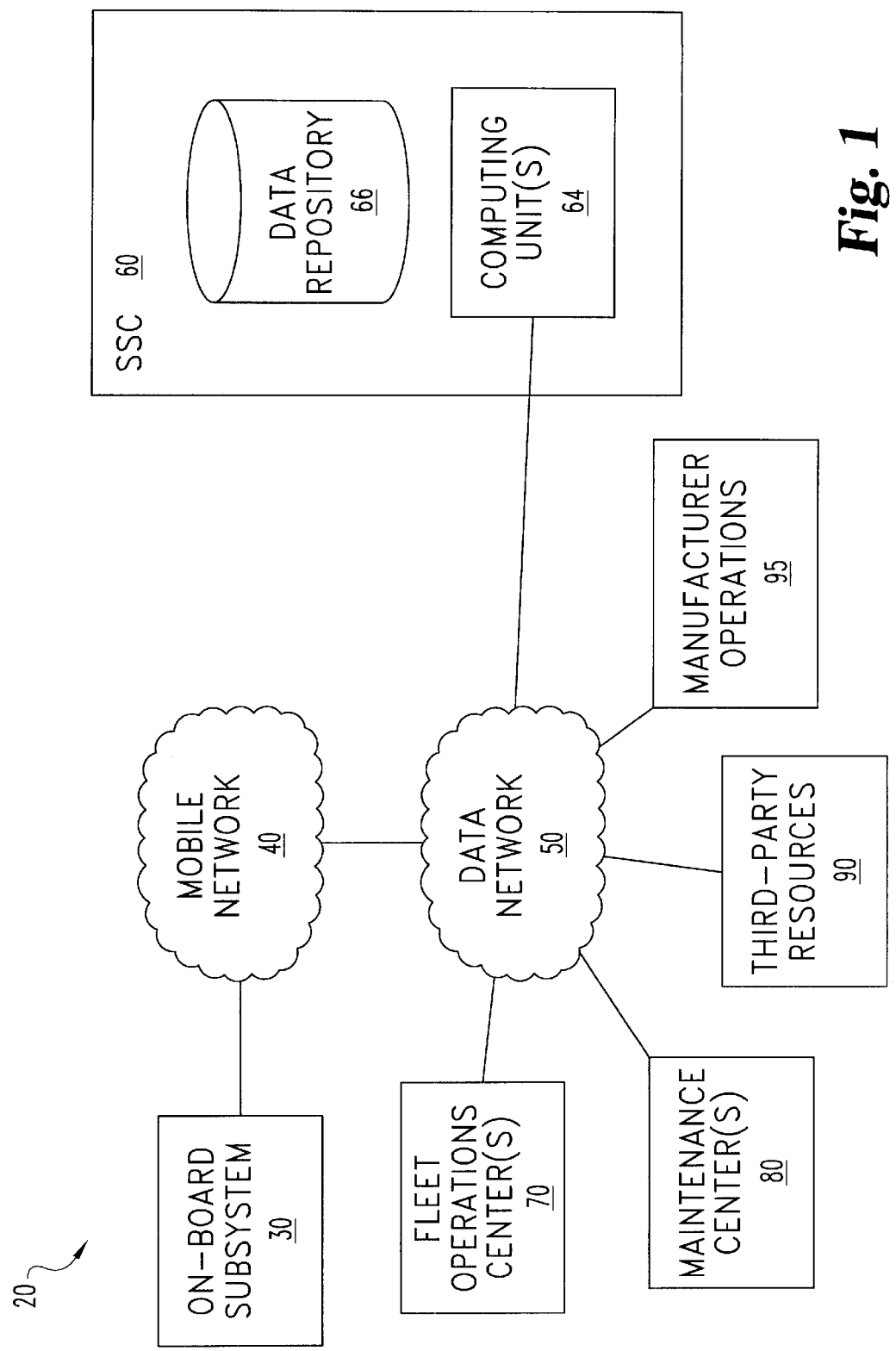
FIG. 1 is a block diagram of a vehicle monitoring, management, and maintenance system that illustrates one embodiment of the present invention.

For the purpose of promoting an understanding of the principles of the present invention, reference will now be made to the embodiments illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates.

Figure 5:
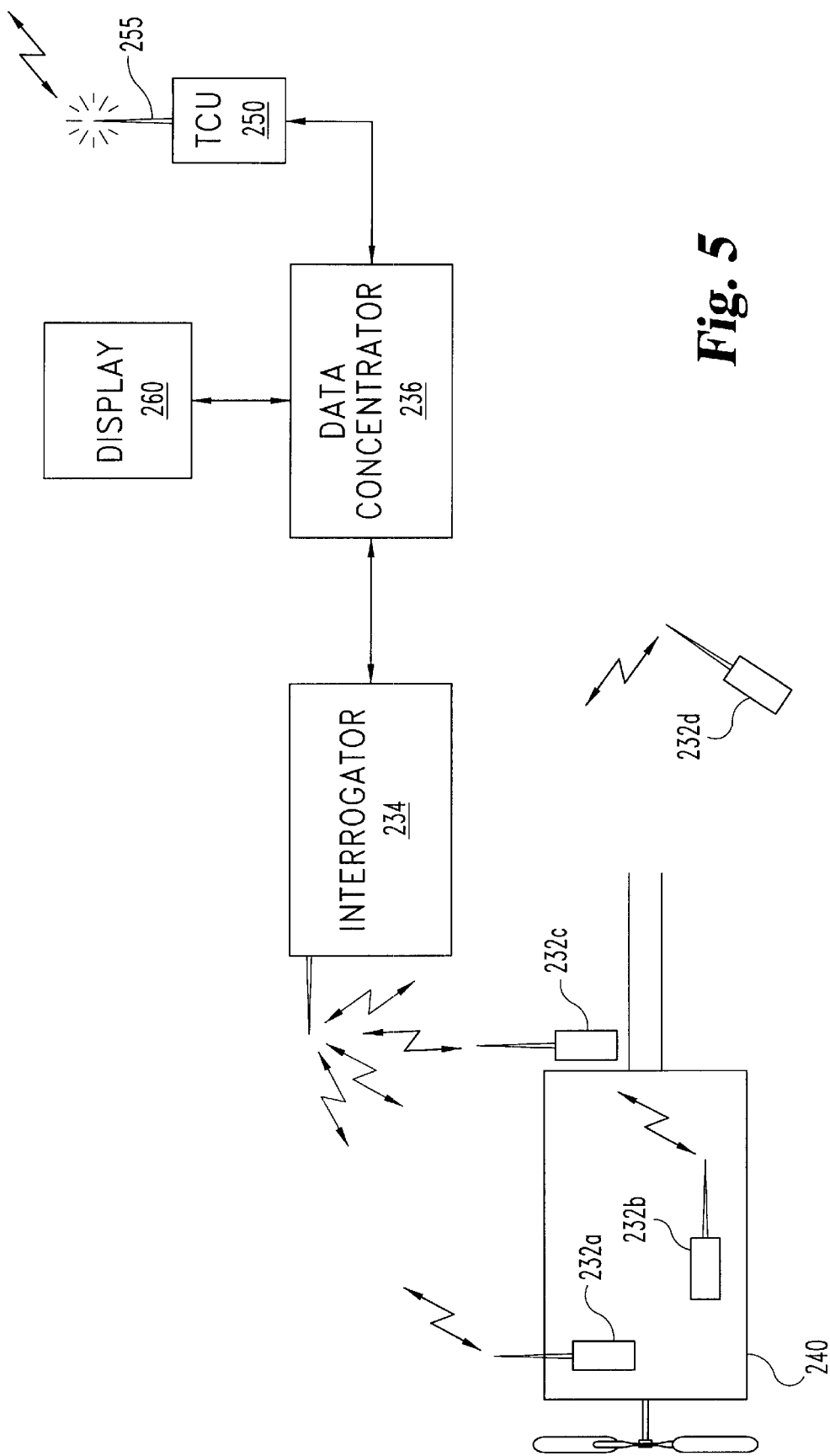
FIG. 5 is a block diagram of selected functional components in a vehicular subsystem that is used in one embodiment of the present invention.
Figure 6:
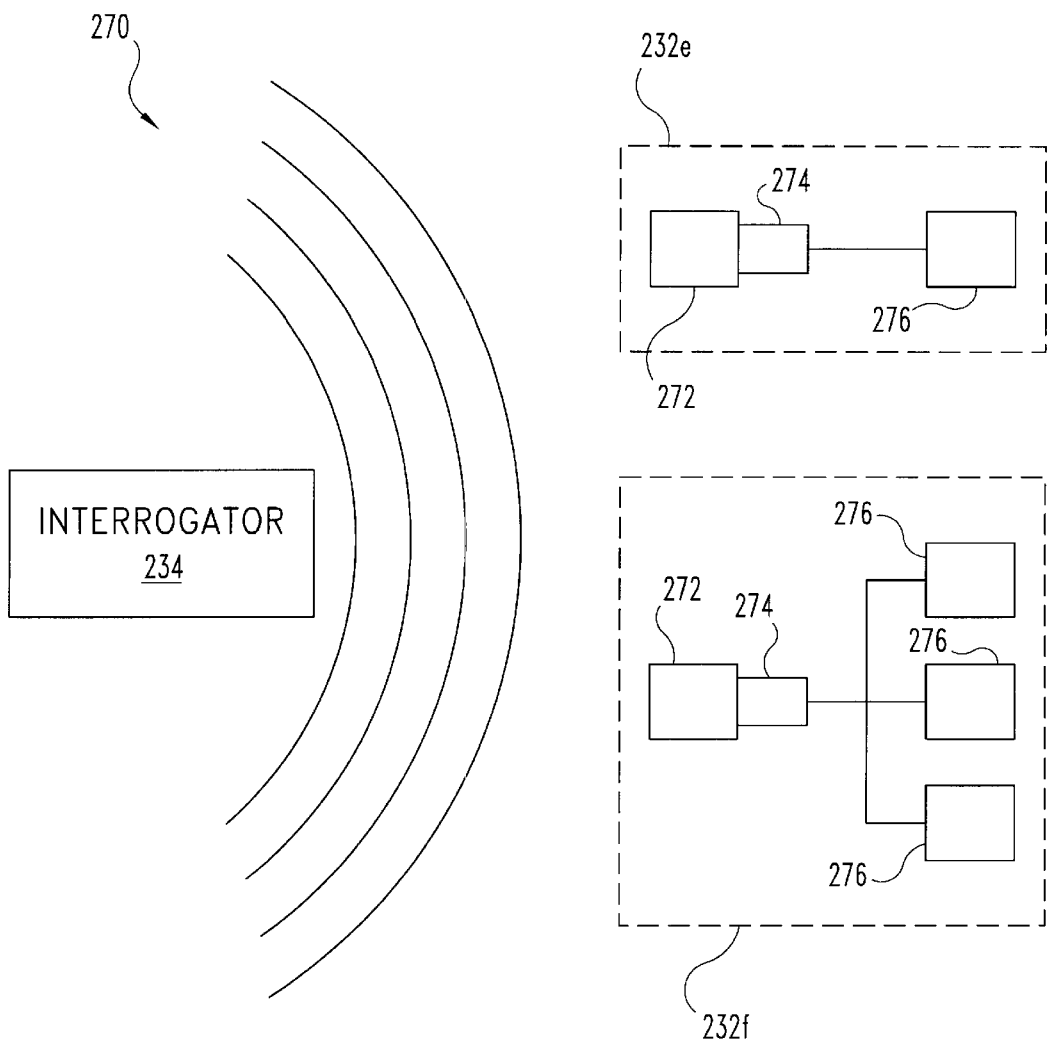
FIG. 6 is a schematic view of an interrogator and two forms of sensor unit for use in some embodiments of the present invention.
Figure 7:
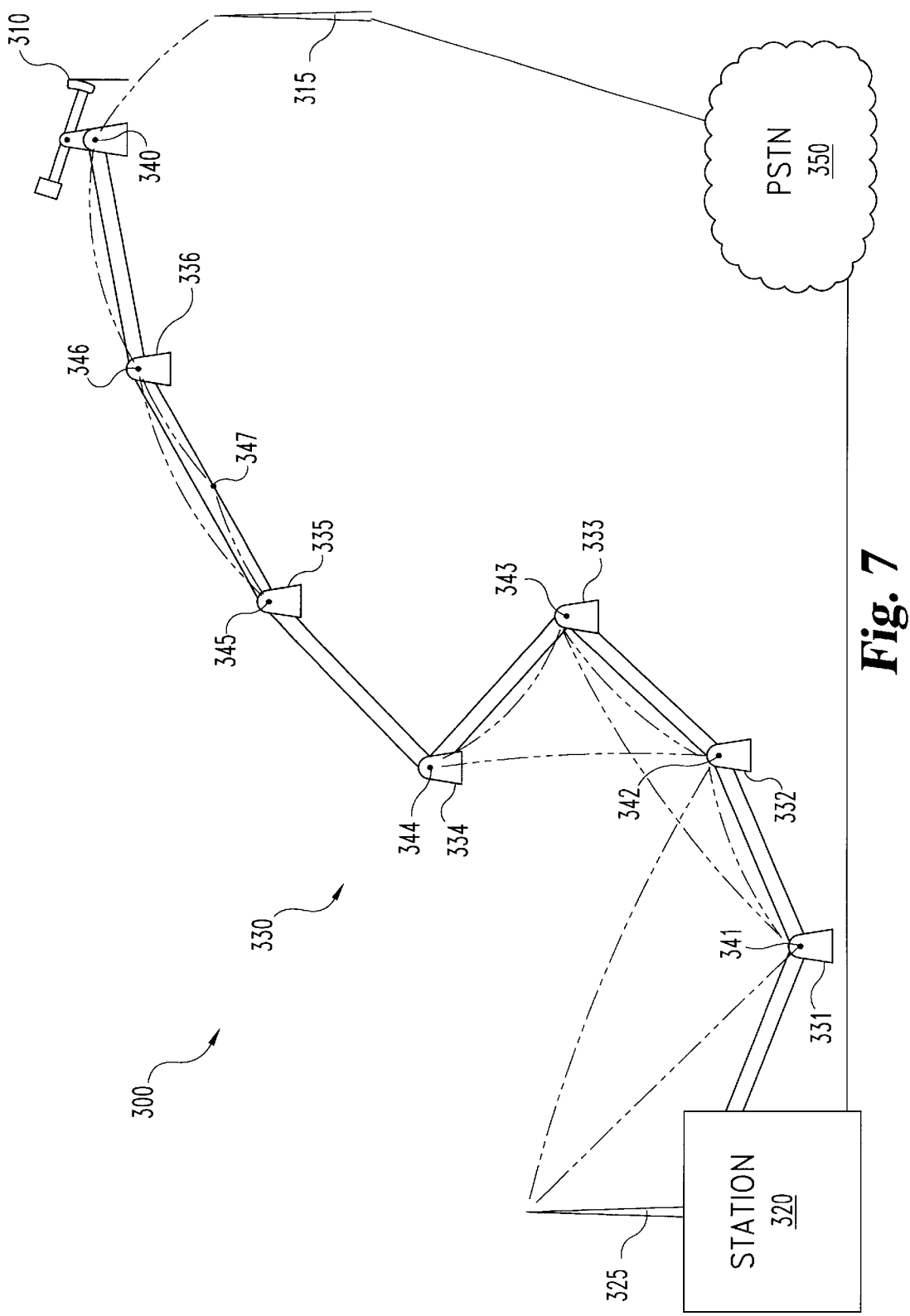
FIG. 7 is a schematic view of a diagnostic/prognostic network of sensor units according to one embodiment of the present invention.

Generally, the system and subsystem illustrated in FIGS. 1-6 flexibly provide diagnostic and prognostic information based on selected vehicle operation data, making that information available to relevant persons and computing processes, and analyzing the data to obtain composite, abstracted, and/or synthesized data relating to multiple time periods and multiple vehicles. Some embodiments can be retrofitted to an existing vehicle without the expense of installing wiring harnesses to physically connect each sensor to the data concentration and analysis component(s) of the system. An alternative embodiment, in which sensor units intercommunicate to acquire and analyze operational data in a stationary system, is illustrated in FIG. 7 and will be discussed below in relation thereto.

The physical connections between components in vehicle management, monitoring, and maintenance system 20 will now be discussed with reference to FIG. 1. An on-board subsystem 30 on some or all vehicles in the system communicates with other major components of system 20 via mobile network 40 and primary data network 50. Mobile network 40 may be, for example, a cellular telephone system or two-way satellite communication system. Data network 50 is preferably (but not necessarily) a single network, such as the Internet, accessible to each major system component.

Service solution center (SSC) 60 comprises computing units 64 and data repository 66, which are discussed in more detail below. Also, connected to this system via data network 50, are one or more fleet operations centers 70, one or more maintenance centers 80, third-party resources 90, and vehicle manufacturer operations center(s) 95.

Figure 2:
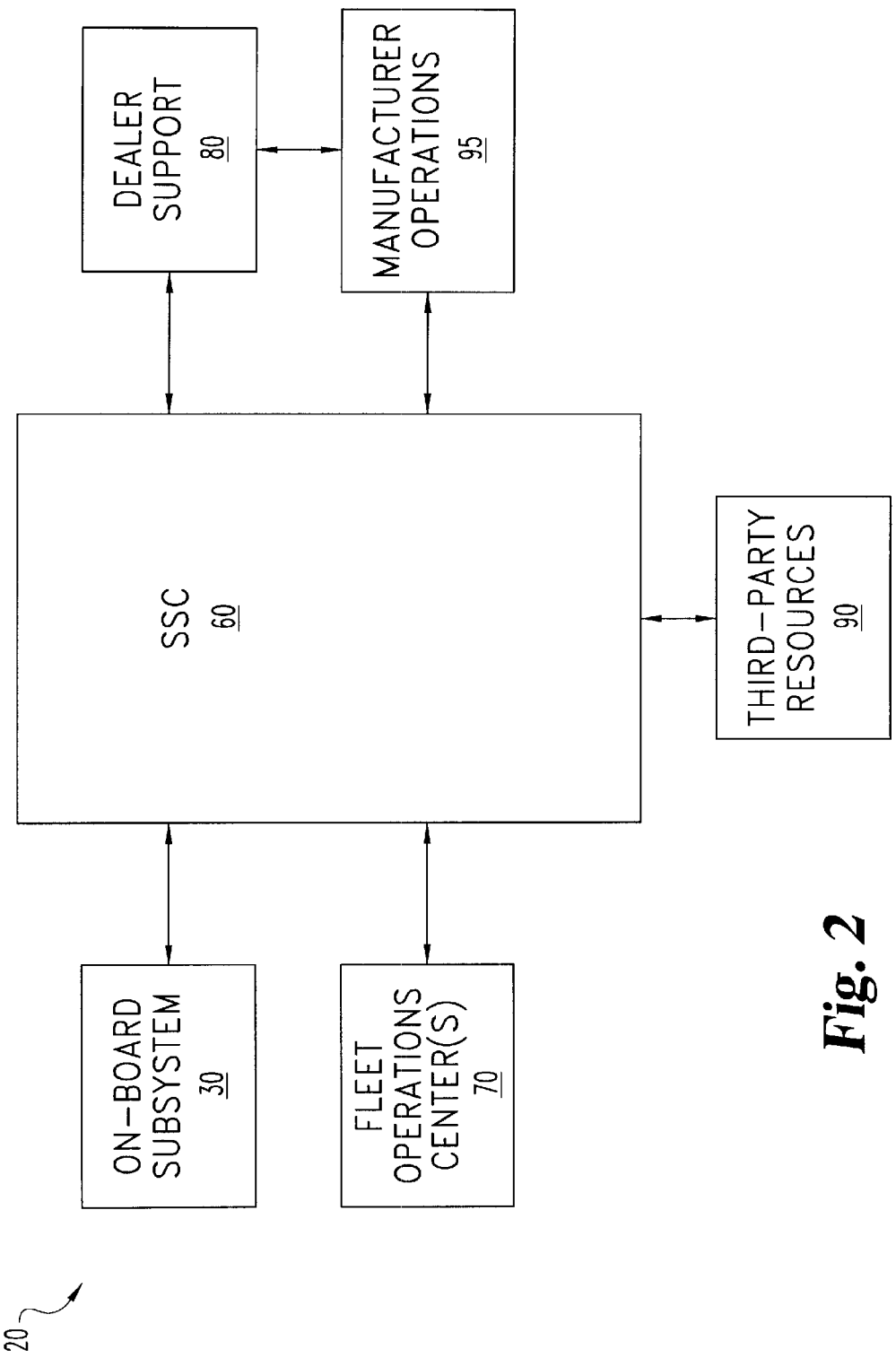
FIG. 2 is a block diagram of communication links between selected high-level components in one embodiment of the present invention.

The paths for the exchange of data between and among the major components of system 20 will now be discussed in relation to FIG. 2 with continuing reference to elements shown in FIG. 1. As can be seen from FIG. 2, SSC 60 is the communications hub for the components as they exchange data. As discussed in further detail below, on-board subsystems 30 provide selected information concerning the operation of the vehicles in the system to SSC 60, which replies with automated and man-in-the-loop responses such as troubleshooting messages and system status updates. SSC 60 also stores and performs analysis of performance data using data repository 66 and computing unit(s) 64, respectively. SSC 60 provides additional services that will be discussed below in relation to FIG. 3.

SSC 60 communicates with fleet operations center 70 regarding the performance and operational status of the vehicles, and with maintenance centers 80 regarding maintenance issues, such as necessary repairs, maintenance, replacement part availability, and technical manuals, to name just a few. In some embodiments, one or more live technicians (represented in FIG. 2 by dealer support 80) provide some or all of the troubleshooting responses that SSC 60 sends to on-board systems 30. Manufacturer 95 also receives information compiled at SSC 60 concerning vehicles it made, and can incorporate that real-world data into future designs. When problems are detected in vehicles being monitored by the system 20, manufacturer 95 can also provide automated and/or man-in-the-loop troubleshooting assistance. Furthermore, manufacturer 95 can use the data acquired through SSC 60 to manage its manufacturing and distribution of replacement parts.

Third-party resources 90 also obtain information from and provide services to SSC 60, the vehicles being monitored, and the other components of system 20. For example, third-party resources 90 provide emergency services and navigational assistance to driver/operators based on the data acquired from on-board subsystems 30.

The interaction among various computing components in on-board subsystems 30 and SSC 60 will now be discussed with reference to FIG. 3 and continuing reference to FIGS. 1 and 2. In on-board subsystem 30, services 131 are accessible to each primary functional component of subsystem 30. Exemplary services 131 include communication services 133, authentication services 135, and advisory, alert, and alarm services 137. Communication service 133 transports data between components of on-board subsystem 30 and other components of system 20. Authentication service 135 protects against unauthorized access to subsystem 30 and authoritatively identifies subsystem 30 when it communicates with other components of system 20. Advisory, alert, and alarm service 137 accepts requests by various processes to communicate such items to the vehicle operator through display 260 (see FIG. 4). A data acquisition (DAQ) and conditioning component 141 acquires data from on-board sensors (discussed in relation to FIGS. 5-6 below). DAQ component 141 filters and conditions the data stream provided by the sensors in an attempt to remove "bad" data (such as noise and detectable errors) before the data is stored, processed, or communicated through the system. Data buffering and management component 143 stores the filtered and conditioned data and provides it to on-board and remote processing components upon request.

Diagnostics component 151 analyzes the data to determine whether problems or failures have occurred or are occurring in the vehicles' systems, and if so, what these problems or failures are. Prognostics component 153 monitors the data values and trends to predict the remaining useful life of the vehicles' components, fluids, and the like. In performing these functions, diagnostics component 151 and prognostics component 153 can, for example, analyze an incoming data stream from one sensor and, depending on the results, request additional information from another sensor through data buffering and management component 143 and DAQ component 141. The results of these analyses are used by other components of system 20 as will be discussed in more detail below.

System status component 155 monitors the values provided by the sensors and communication links to detect failing and failed sensors and/or failed communication links. System status component 155 uses rule-based or neural network-based analysis as would occur to one skilled in the art.

Operational status component 157 synthesizes an overall "health-code" for the vehicle. In the illustrated embodiment, a two-character code provides high-level information regarding the functioning of the vehicle to the vehicle's operator via display 260 (see the discussion of FIG. 5 below). For example, "OK" indicates that all systems are functioning normally, while "OC" indicates that the system recommends an oil change at the earliest opportune time.

SSC 60 comprises services 161, including communication service 163, authentication service 165, process scheduling service 167, and notification service 169. Communication service 163 manages data exchange between the objects and components running in SSC 60 and other components of system 20, including on-board subsystems 30. Authentication service 165 protects SSC 60 from improper access using encryption, passwords, and other methods known to those skilled in the art, as well as authoritatively identifying SSC 60 to the other components of system 20. Process scheduler 167 coordinates and prioritizes activities and/or communications involving SSC 60, whereas notification service 169 receives, manages, and distributes notifications among components of system 20 (for example, manufacturers' recall notices from manufacturer operations 95 to on-board subsystems 30).

Data collection component 171 handles interactions between SSC 60 and on-board subsystems 30. Data collection component 171 feeds that data through access control component 173 to data/information management component 175, which stores the relevant data in data repository 66 (see FIG. 1). Prognostics component 181 analyzes the data stored in data/information management component 175, adding its data and computing resources to the activities described for prognostics component 153 of on-board subsystems 30. When additional information is desired for a prognosis and/or diagnosis analysis or decision by prognostics component 181, the information is requested in a request message from SSC 60 to the particular on-board subsystem 30. The requested information is then acquired by DAQ component 141 and communicated back to prognostics component 181 as discussed above in relation to the primary data stream.

Software agent management component 183 generates, monitors, maintains, and manages software agents as discussed in further detail below. Analysis component 185 provides high-level analyses of data stored in data/information management component 175, as well as data mining functions as would occur to one skilled in the art. Reporting component 187 provides a variety of views of the collected data for reporting to various persons, computers and/or entities as would occur to one skilled in the art.

An on-board subsystem 220 of one embodiment of the present invention will now be discussed in relation to FIG. 4, and may correspond in some embodiments of the invention to an on-board subsystem 30 in FIGS. 1–3, to which continuing reference will be made. Sub-system 220 includes a ground transport vehicle 222 with engine compartment 224 and vehicle operator compartment 226. A cutaway of engine compartment 224 reveals a schematically depicted control system 230 and internal combustion engine 240. Control system 230 monitors and regulates operation of engine 240, which is the primary source of motive power for vehicle 222. In vehicle operator compartment 226, a display 260 visible by an operator in operator compartment 226 is also illustrated, as will be more fully described hereinafter. Telematics control unit (TCU) 250 communicates with control system 230 and incorporates transceiver functionality for communication between control system 230 and SSC 60.

Selected components of subsystem 220 will now be discussed in relation to FIG. 5, with continuing reference to FIGS. 1–4. Sensor units 232a, 232b, 232c, and 232d (generically and collectively referred to as sensor unit(s) 232) each detect one or more operating parameters of vehicle 222 and convert those parameters to digital values. Interrogator 234 (consisting, for example, of a 430 processor from Texas Instruments of Dallas, Tex., U.S.A., and one or more DSP ICs from Analog Devices, Inc. of Norwood, Mass., U.S.A.) occasionally and selectively interrogates certain individual sensor units 232, which respond by wirelessly transmitting back to interrogator 234 a reply signal to indicate the value(s) of the requested sensed quantities that it most recently detected. This communication is preferably conducted using a published protocol, such as the MIT Auto ID Protocol.

Interrogator 234 converts the reply signal from the respective sensor 232 into a digital signal, and forwards that digital signal to data concentrator 236. Concentrator 236 may, for example, be a Redi-Pro Controller from Pacific Northwest National Laboratory of Richland, Wash., U.S.A. Data concentrator 236 monitors the data values returned from sensors 232 and performs analysis on them, such as the computing services and components shown in FIG. 3. As discussed below, certain results of that analysis and outputs of those components are communicated to the operator of the vehicle via display 260, while other results are communicated to SSC 60.

The embodiment illustrated in FIG. 5 shows some examples of sensors and operating parameters that might be used in some embodiments of the present invention. Sensor 232a measures the temperature of coolant in engine 240, while sensor 232b measures oil pressure and quality. Sensor 232c detects and quantifies vibration in the vehicle's transmission, while sensor 232d measures tire pressure. Data concentrator 236 monitors these operational parameters to detect any variation outside a proper range of values. For example, the tire pressure detected by sensor 232d might properly be 18 PSI, but it may be that little damage is caused or safety risk incurred if the pressure is between about 16 and 20 PSI. Data concentrator 236 checks the detected values against this range of acceptable values and reports deviations therefrom to the operator of the vehicle via display 260 and to the SSC 60 via TCU 250. Data concentrator 236 also checks the detected parameters for rates of change that exceed acceptable levels. This latter technique can provide an earlier warning of a failure. For example, a parameter normally between 75 and 1000 might have several samples near 150 followed by a sample at 700 units. Although the sample is still within the acceptable range, the rapid change could indicate a catastrophic failure that, using the present system, can be immediately detected, investigated, and reported.

The values and changes in the values over time are also used by data concentrator 236 to predict failures and more accurately estimate the useful life of various components or the need for service or maintenance work. For example, early replacement of a vehicle's tires might be indicated following an extended period of operation at tire pressures outside the tires' specifications. That indication is communicated to the operator via display 260 with a message such as "TIRE REPLACEMENT INDICATED IN 2000 MILES" or by a two-character code ("T2", for example) as described above in relation to FIG. 3. A similar message is generated at SSC 60, where automated equipment places an order for the new tires to be delivered at or near the expected location of vehicle 22 after it travels about 2000 more miles. Display 260 might or might not indicate whether that information has been transmitted to SSC 60.

The general structure of sensor units 232 will now be discussed in relation to FIG. 6 with reference to certain components shown in FIGS. 4 and 5. Vehicle 222 is instrumented with one or more sensor units 232 that are each communicatively linked to interrogator 234 by a wireless transponder 272. The wireless transponder 272 is in the form of an RF tag arrangement 274. In some embodiments, the RF tag 274 and sensor unit(s) 276 is/are provided as a unit with which one can retrofit vehicle 222. In an alternative embodiment, shown as sensor unit 232f, one RF tag 274 can manage data from multiple sensors 276 using techniques that would occur to one skilled in the art. In such embodiments, RF signals 270 can be modulated to elicit responses from a selected one or more sensors 276.

Interrogator 234 uses radio frequency interrogation signals 270 to selectively stimulate one or more RF tags 274 to receive information sensed with the corresponding sensor(s) 276 in response. In various embodiments, sensor(s) 276 may be one or more of an XTM-190 series miniature pressure transducer (available from Kulite Semiconductor Products, Inc., Leona, N.J., U.S.A.), custom-manufactured thermocouples (such as those sold by NANMAC of Framingham, Mass., U.S.A.), a Belhaven ARIS 1–8 channel infrared analyzer (supplied by Belhaven Applied Technologies of Kennewick, Wash., U.S.A.), miniature piston viscometer (such as model 570 or 372J from Cambridge Applied Systems of Medford, Mass., U.S.A.), or elemental analysis components (such as custom-designed components or models CT 5000 or CT 8000 from KeyMaster Technologies of Kennewick, Wash., U.S.A.).

An alternative embodiment of the present invention will now be discussed with reference to FIG. 7. Generally, FIG. 7 shows a system 300 comprising an oil well 310 that sends oil to station 320 through pipeline 330. Pumping substations 331–336 pump the fluid from well 310 to station 320 as is known in the art of oil transport. At each pumping station 331–336 is installed a sensor unit 341–346, respectively. In addition, sensor unit 347 is installed in the pipeline segment between pumping stations 335 and 336. Sensor unit 340 detects operating parameters of well 310.

The configuration illustrated in FIG. 7 has several properties that are advantageous to many different uses of the invention. For example, certain of sensors 340–347 communicate with each other. Data from sensor unit 342 can be communicated through sensor unit 341 and antenna 325 to data storage and analysis resources at station 320. In fact, the sensor units 341–344 at pumping stations 331–334, respectively, can communicate not only with base station antenna 325 and sensor units on adjacent pumping stations, but also with sensor units on pumping stations that are two segments away (e.g., the sensor unit 344 at pumping station 334 can communicate directly with sensor unit 342 at pumping station 332, which can communicate directly with antenna 325). In this manner, even if a single sensor unit fails, information can still be shared between the main station 320 and sensor units further down the line from the failed sensor unit, without the base station 320 having to communicate directly with each sensor unit. Likewise, requests for additional data can still travel from station 320 to sensors upstream of the failed unit.

Sensor units 345, 346, and 347 communicate their data to station 320 via sensor unit 340 and transceiver/antenna 315. In this embodiment, sensor unit 340 comprises logic that analyzes data from sensor units 345–347 to generate status information and/or higher-level data for communication to station 320. In some embodiments, sensor unit 340 further comprises logic to generate alerts based on the sensed data, as was discussed above in relation to diagnostics and prognostics components 151, 153, and 181 in FIG. 3. Transceiver/antenna 315 communicates the sensed and/or abstracted data through public switched telephone network (PSTN) 350 with station 320 constantly, periodically, and/or upon generation of an alarm event by the sensor network as discussed above in relation to FIGS. 3–5. The communications link between transceiver/antenna 315 and PSTN 350 may be of the conventional digital or analog variety. In some variations of this embodiment, the connection between transceiver/antenna 315 and station 320 is a direct data link of either a wired or wireless variety.

Figure 3:
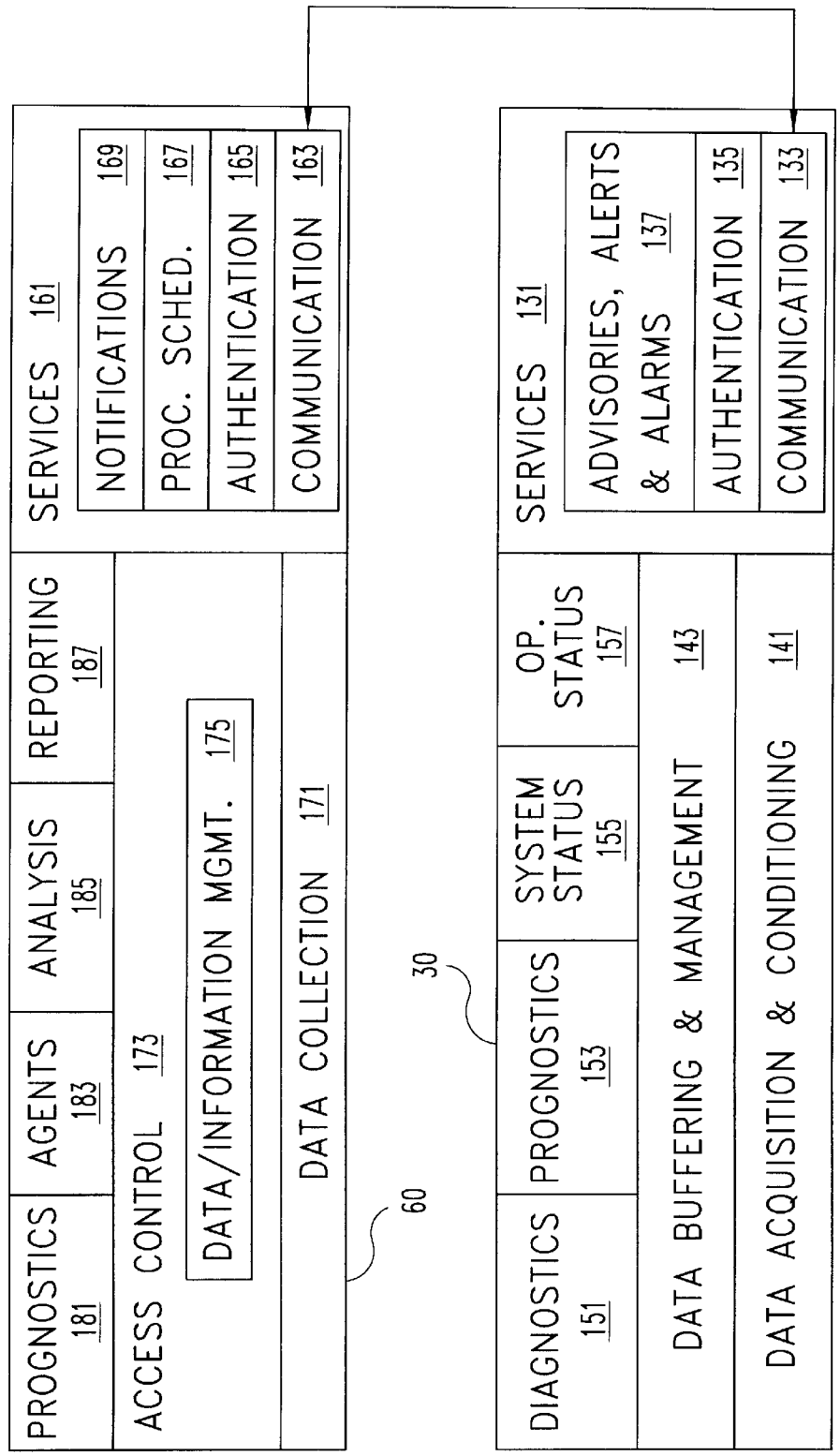
FIG. 3 is a block diagram illustrating the relationships between certain functional components of selected computing resources in the system illustrated in FIGS. 1–2.
Figure 4:
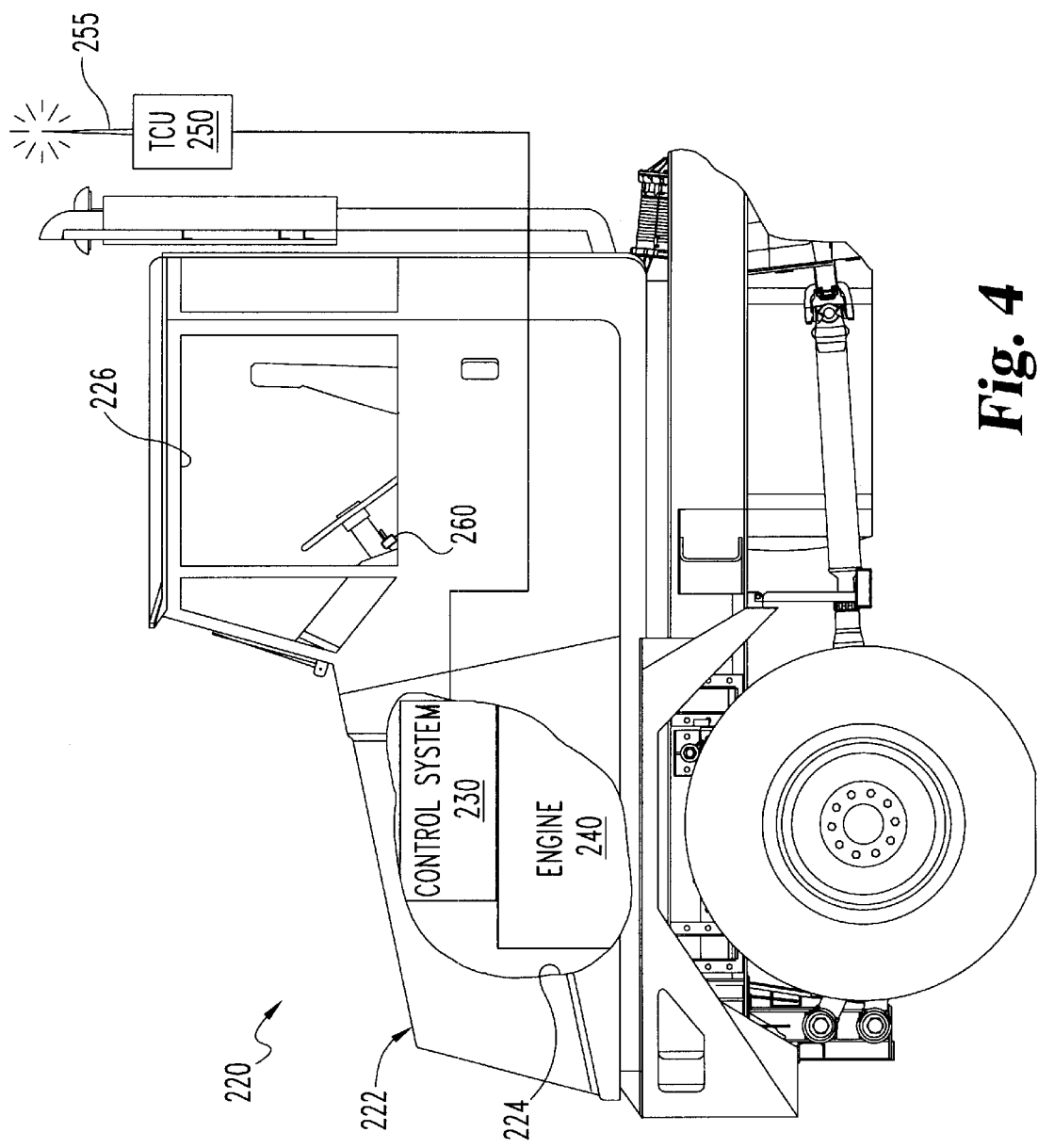
FIG. 4 is a partial cutaway view of selected physical components in a vehicular system that is used in one embodiment of the present invention.

Encryption and authentication techniques are applied to the data exchanged among components of system 20 or system 300, as mentioned above in relation to components 135 and 165 in FIG. 3. These techniques might, for example, use public-key cryptography, shared-key (or "private key") cryptography, Diffie-Hillman key agreement techniques, message authentication codes (MACs), message digests, and other techniques as would occur to one skilled in the art.

It is noted that, as used herein, "machine" may be broadly interpreted to encompass any wholly or partially mechanical system that has or interacts with an environment having a measurable quantity that reflects a system status or performance. Of many possibilities, some examples include vehicles, stationary manufacturing equipment, computers, and buildings. In addition, a "subsystem" is a system designed, arranged, or adapted to be used in, or integrated with other components to make up another system.

Furthermore, it will be seen by those skilled in the art that a variety of types of data may be communicated between components of this system. For example, in system 20 shown in FIGS. 1–6, a sensor 232 might provide spectrum analysis data to data concentrator 236, which could detect water in the engine's oil system based on that data. Data concentrator 236 might then communicate a "water in the oil" signal via TCU 250 to SSC 60. A person or computing process at SSC 60 could then send a response message back, comprising a request for temperature and vehicle speed data. Data concentrator 236 then uses interrogator 234 to acquire the requested data, then communicates that data back to SSC 60 in one or more reply messages. Depending on the information in the reply message(s), SSC 60 can issue advice to the operator of vehicle 222 regarding operation of that vehicle until repairs are made, can prepare for staffing needs at a maintenance center 80, and can adjust fleet scheduling through a fleet operations center 70. The ability provided by the present invention to interactively and selectively inquire of various sensors would, at least in this case, reduce the amount of information that had to be continuously exchanged between vehicle 222 and SSC 60 in order to make informed diagnosis/prognosis decisions, to enable integration with many outside systems, and to allow a much more complete diagnosis without requiring wired connections between the sensors, analysis hardware, and telematics hardware. Many additional advantages will be apparent to those skilled in the art.

Sensor units 232 and their components may be powered in several different ways, depending on the particular sensor configuration, the location of sensors in the vehicle, cost constraints, and other design criteria, as would occur to one skilled in the art. For example, RF tags 274 may be powered by vehicle power, a battery connected to the tag, or the interrogation signal itself, to name just a few options. It is noted that, although the above description uses terminology characteristic of communications using active or semi-active tags, the invention may also be implemented without undue experimentation in systems that use semi-passive RF tags in systems that use semi-passive RF tags. Some such implementations have the advantage over active-tag embodiments of lower power requirements and complexity at the sensor site, which enables sensors to be placed in locations not typically serviceable by active tags.

All prior applications and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only selected embodiments have been shown and described and that all changes and modifications that would occur to one skilled in the relevant art are desired to be protected.

What is claimed is:

1. A system, comprising:
    a processor;
    a wireless signal transceiver in communication with said processor;
    two or more sensors configured to detect two or more operating parameters of a machine and generate corresponding parameter information signals;
    one or more transponder means configured to receive the parameter information signals from said sensors and wirelessly communicate the operating parameter data to said wireless signal transceiver in response to a selective interrogation signal;
    a processor-readable medium, in communication with said processor, encoded with programming instructions executable by said processor to:
        control generation by said transceiver of the selective interrogation signal, and
        perform computations on the operating parameter data.

2. The system of claim 1, wherein said computations comprise determining a machine state as a function of the operating parameter data.

3. The system of claim 2, further comprising a display means, in communication with said processor, for visually communicating the machine state to a person.

4. The system of claim 3, wherein:
    the machine has an operator compartment; and
    said display means is in the operator compartment.

5. The system of claim 2, further comprising:
    a stationary monitoring facility in communication with said processor through a wireless link; and
    a state message from said processor to said monitoring facility through said wireless link reflecting the machine state.

6. The system of claim 5, wherein the communication between said monitoring facility and said processor passes through a public access data network.

7. The system of claim 5, wherein said wireless link comprises a public access cellular communications network.

8. The system of claim 5, wherein said wireless link is a two-way link.

9. The system of claim 8, further comprising a responsive message from said monitoring facility to said processor, where the responsive message is sent in response to state messages that indicate one or more predetermined machine states.

10. The system of claim 9, wherein said responsive message is a request for specific additional data regarding one or more of the operating parameters; and
    further comprising a reply message through the wireless channel from said processor to said monitoring facility containing the requested additional data.

11. The system of claim 1, wherein at least one transponder means is an RF tag.

12. The system of claim 11, wherein the at least one transponder means includes no internal power source.

13. The system of claim 11, wherein the at least one transponder means comprises an internal power source.

14. The system of claim 11, wherein the at least one transponder means shares a power source with the machine.

15. The system of claim 1, wherein at least a first one of said one or more transponder means is further configured to:
    generate a selective interrogation signal to which a second one of said one or more transponder means is configured to respond;
    receive the parameter information signals from the second transponder means; and
    communicate the parameter information signals to said wireless signal transceiver.

16. A system, comprising:
    a processor;
    a wireless signal transceiver in communication with said processor;
    one or more sensors collectively configured to detect two or more operating parameters of a vehicle;
    one or more tag means for receiving the operating parameters from said sensors and wirelessly communicating the operating parameters to said wireless signal receiver;
    a processor-readable medium, in communication with said processor, encoded with programming instructions executable by said processor to:
        develop a report signal as a function of the operating parameters; and
    send said report signal to a display device.

17. The system of claim 16, wherein:
    the vehicle has an operator's compartment; and
    the display device is configured to be observed by a person in said operator's compartment.

18. The system of claim 16:
    further comprising a fleet command center; and
    wherein the display device is configured to be observed by a fleet operator in said fleet command center.

19. The system of claim 16, wherein said report signal reflects the result of processing a plurality of the operating parameters.

20. The system of claim 19 wherein said report signal reflects diagnosis based on a plurality of operating parameters.

21. The system of claim 19, wherein said report signal reflects a prognosis based on a plurality of operating parameters.

22. The system of claim 16, wherein at least one of said one or more tag means is an RE tag.

23. The system of claim 22, wherein said RE tag is semi-passive.

24. The system of claim 22, wherein said RE tag is semi-active.

25. The system of claim 22, wherein said RE tag is active.

26. The system of claim 16, wherein said programming instructions are executable by said processor to:

effect an interrogation of said one or more tag means to obtain one or more data signals; and perform at least one computation on said one or more data signals.

27. A system for maintaining a plurality of vehicles, comprising:

a management center; and an on-board subsystem on each vehicle, each said subsystem comprising:

one or more sensors that collectively sense a plurality of operating parameters of the vehicle;

one or more transceivers, each in communication with one or more sensors, that communicate a data signal indicative of the operating parameters in response to an interrogation signal;

one or more interrogators configured to selectively produce the interrogation signals and receive the data signals;

a processor, in communication with said one or more interrogators and a computer-readable medium, wherein the computer-readable medium is encoded with programming instructions executable by said processor to:

perform analysis of the health of one or more portions of the vehicle based on the operating parameters indicated by the data signals to produce one or more result signals; and control production of interrogation signals by said one or more interrogators; and communications hardware in communication with said processor to communicate at least one of said one or more result signals to said management center.

28. The system of claim 27, wherein said management center is configured to generate a response signal to said one or more result signals and send it to said communications hardware.

29. The system of claim 28, wherein said response signal indicates instructions to an operator of the vehicle.

30. The system of claim 28, wherein:

said response signal comprises a request for additional information concerning additional operating parameters of the vehicle, where the additional operating parameters were not described in said result signal; and the programming instructions are further executable by said processor to:

cause said one or more interrogators to selectively request the additional information;

cause said communications hardware to transmit the additional information to said management center.

* * * * *